(12) United States Patent
Kato

(10) Patent No.: US 6,483,945 B1
(45) Date of Patent: Nov. 19, 2002

(54) MOVING PICTURE ENCODING METHOD AND APPARATUS

(75) Inventor: Motoki Kato, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/238,096

(22) Filed: Jan. 27, 1999

(30) Foreign Application Priority Data

Feb. 2, 1998 (JP) ............................................ 10-021150
Oct. 27, 1998 (JP) ............................................ 10-305839

(51) Int. Cl.⁷ ............................ G06K 9/46; H04N 7/36
(52) U.S. Cl. ...................................... 382/236; 348/699
(58) Field of Search ................................. 382/232, 233, 382/236, 238, 246, 248, 251; 348/699, 416, 700, 411, 400, 402, 397, 401

(56) References Cited

U.S. PATENT DOCUMENTS 3,940,736 A * 2/1976 Inaba et al. ............... 340/146.1
5,349,383 A * 9/1994 Parke et al. ................. 348/397
5,875,003 A * 2/1999 Kato et al. .................. 348/699

* cited by examiner

Primary Examiner—Leo Boudreau
Assistant Examiner—Duy M. Dang
(74) Attorney, Agent, or Firm—Frommer Lawrence & Haug LLP; William S. Frommer; Glenn F. Savit

(57) ABSTRACT

Method and apparatus for encoding moving pictures in which a bitstream of encoded moving pictures has a bit rate contained within a pre-set range. The bit rate of a unit domain, such as a GOP, of an encoded bitstream is compared to a reference value. If the bit rate exceeds the reference value, the unit domain is converted, typically by re-quantization, so that its bit rate will no longer exceed the reference value.

25 Claims, 12 Drawing Sheets

FIG.6A ARRAY OF INPUT BITSTREAM

GOP-n: ... | GOP-(n-1) | In2 Bn0 Bn1 Pn5 Bn3 Bn4 Pn8 Bn6 Bn7 | GOP-(n+1) | ...

FIG.6B ARRAY OF ENCODED BITSTREAM ON RE-ENCODING GOP-n

... | GOP-(n-1) | GOP-new-n | GOP-(n+1) | ...

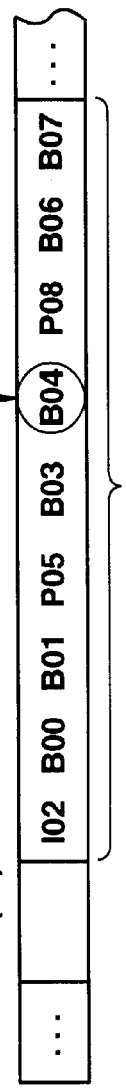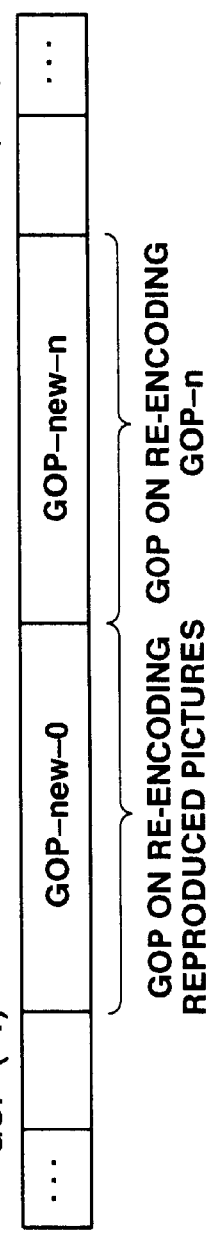
FIG.9A
FIG.9B
FIG.9C

| | |
|---|---|
| S23 | ... I02 B00 B01 P05 B03 B04 P08 B06 B07 |
| S25 | ... F00 F01 F02 F03 F04 |
| PICTURE-CODING-TYPE ASSIGNMENT TO F00-F04 | B B I B P |
| S28 (S25 INPUT) | ... I02 B00 B01 P04 B03 |
| S24 | In2 Bn0 Bn1 Pn5 Bn3 Bn4 Pn8 Bn6 Bn7 |
| S26 | Fn0 Fn1 Fn2 Fn3 Fn4 Fn5 Fn6 Fn7 Fn8 |
| PICTURE-CODING-TYPE ASSIGNMENT TO Fn5-Fn8 | I B B P |
| S28 (S26 INPUT) | In5 Pn6 Bn6 Bn7 |
| S29 | GOP-(n+1) ... |
| S30 | GOP-(n+1) ... |
| S31 | ... I02 B00 B01 P04 B03 In5 Pn8 Bn6 Bn8 GOP-(n+1) ... |

FIG.11

MOVING PICTURE ENCODING METHOD AND APPARATUS

BACKGROUND OF THE INVENTION

1. Field of the Invention

This invention relates to a moving picture encoding method and apparatus in which an input bitstream is decoded to picture signals which are then re-converted into and outputted as a bitstream.

2. Description of the Related Art

Recently, the so-called MPEG (Moving Picture Experts Group) or MPEG2, which combines the encoding of picture signals for compression with redundancy reducing processing by orthogonal transform such as discrete cosine transform (DCT) with motion compensation MC, is in widespread use.

Non-compressed picture data is compressed by, for example, the above-mentioned MPEG technique, into coded pictures, such as intra-coded pictures (I-pictures), an interframe predictive coded pictures (P-pictures) or bi-directionally predictive coded pictures (B-pictures), for recording on a storage medium such as a magneto-optical disc or transmission over a telephone network.

The manner in which signals compressed in accordance with the MPEG system are reproduced is hereinafter explained.

On a recording medium, there is recorded encoded data of a data stream shown in FIG. 1A. This data stream, recorded as shown in FIG. 1A, is decoded and displayed in a picture sequence shown in FIG. 1B. It is noted that "I", "P" and "B" annexed to the respective pictures as symbols stand for the distinction between the I-, P- and B-pictures, with suffix numerals specifying the so-called temporal reference denoting the display sequence of the pictures in a group-of-pictures (GOP).

For reproducing encoded data of the data stream, shown in FIG. 1A, the picture I0 is first reproduced. Since the I-picture is complete in one frame, the picture I0 can be decoded by itself without decoding other pictures. Based on the decoded picture I0, a picture P2, encoded by forward predictive coding, is decoded. Since the P-picture is predictive coded from a temporally previous I- or P-picture, the picture I0 needs to be decoded before decoding this picture P2 in the case of a conventional recording/reproducing apparatus. Then, based on the decoded pictures I0 and P2, a bidirectionally predictive coded picture B1 is decoded. Since the B-picture is bidirectionally predictive coded from the temporally previous and succeeding I- or P-pictures, the pictures I0 andP2 need to be decoded before decoding the picture B1. The encoded data of the data stream shown in FIG. 1A is decoded in the sequence of I0→P2→B1→P4→B3→P6→B5→I8→B7→P10→B9→ . . . .

For displaying the pictures, decoded in the above-mentioned sequence, the picture sequence is interchanged, as shown in FIG. 12B, to display the pictures in the sequence of I0→B1→P2→B3→P4→B5→P6→B7→I8→B9→P10→ . . . .

Incidentally, when a bitstream of encoded moving pictures is to be recorded on a recording medium, if the bit rate (hereafter, "bitrate") of the bitstream exceeds an upper limit of the recording rate of the recording medium, the bitstream occasionally cannot be recorded in a normal manner on the recording medium. Also, when decoding the bitstream of encoded moving pictures, if the bitrate of the bitstream deviates from a certain bitrate range as set by a buffer, failure in decoding is likely to occur.

SUMMARY OF THE INVENTION

It is therefore an object of the present invention to provide a moving picture encoding method and apparatus in which the bitrate of the bitstream of encoded moving pictures can be brought into a pre-set bitrate range.

In one aspect, the present invention provides a moving picture encoding apparatus including comparator means for comparing the bitrate of a unit domain of a bitstream, pictures of which are previously encoded, to a reference value, and bitrate conversion means for converting the unit domain of the bitstream so that the bitrate will be not higher than the reference value if the comparator means verifies that the bitrate of the unit domain of the bitstream is in excess of the reference value, the bitrate conversion means outputting the bitstream with the bitrate remaining unchanged if the comparator means verifies that the bitrate of the unit domain of the bitstream is not in excess of the reference value.

In the present moving picture encoding apparatus, the bitrate of the bitstream is kept at all times below the reference value based on results of detection by the comparator means.

In another aspect, the present invention provides a moving picture encoding method including the steps of comparing the bitrate of a unit domain of a bitstream, pictures of which are previously encoded, to a reference value, and converting the unit domain of the bitstream so that the bitrate will be not higher than the reference value if the comparator step verifies that the bitrate of the unit domain of the bitstream is in excess of the reference value, the bitrate conversion step outputting the bitstream with the bitrate remaining unchanged if the comparator step verifies that the bitrate of the unit domain of the bitstream is not in excess of the reference value.

In the present moving picture encoding method, the bitrate of the bitstream is kept at all times below the reference value based on the results of comparison between the reference value and the bitrate.

In still another aspect, the present invention provides a moving picture encoding apparatus including comparator means for comparing the bitrate of a unit domain of a bitstream, pictures of which are previously encoded, to a reference value, re-encoding means for decoding a unit domain of an input bitstream into picture signals and re-encoding a unit domain of the input bitstream into picture signals if the comparator means verifies that the bitrate of the unit domain of the bitstream is in excess of the reference value, the re-encoding means re-encoding the decoded picture signals into a unit domain of a bitstream having a bitrate not higher than the reference value, and substitution means for substituting the unit domain of the bitstream re-encoded by the re-encoding means for the unit domain of the input bitstream and outputting the resulting bitstream.

In the present encoding apparatus, the bitstream is decoded and re-encoded, if, based on the results of detection by the comparator means, the bitrate of the bitstream is in excess of the reference value.

In yet another aspect, the present invention provides a moving picture encoding method including a comparator step for comparing the bitrate of a unit domain of a bitstream, pictures of which are previously encoded, to a reference value, a re-encoding step for decoding a unit domain of an input bitstream into picture signals and re-encoding a unit domain of the input bitstream into picture signals if the comparator step verifies that the bitrate of the unit domain of the bitstream is in excess of the reference value, the re-encoding step re-encoding the decoded picture signals into a unit domain of a bitstream having a bitrate not higher than the reference value, and a substitution step for substituting the unit domain of the bitstream re-encoded by the re-encoding step for the unit domain of the input bitstream and outputting the resulting bitstream.

In the present encoding method, the bitstream is decoded and re-encoded, if, based on the results of detection by the comparator step, the bitrate of the bitstream is in excess of the reference value.

With the moving picture encoding method and apparatus according to the present invention, if the bitrate of a unit domain is detected to be in excess of a reference value, the unit domain is converted so that the unit domain of the bitstream will have a bitrate not larger than the reference value. If conversely the bitrate of a unit domain is detected not to be in excess of a reference value, the bitstream is outputted with the bitrate remaining unchanged. Thus, the bitstream can be recorded as normally with the bitrate below the recording rate of the recording medium to evade the failure of the buffer memory due to the increased bitrate.

With the moving picture encoding method and apparatus according to the present invention, if the bitrate of a unit domain is detected to be in excess of a reference value, the unit domain of the bitstream is decoded into picture signals, and the decoded picture signals are re-encoded into a unit domain of a bitstream having a bitrate lower than the reference value. The re-encoded unit domain of the bitstream is substituted for the unit domain of the input bitstream. Thus, the bitrate of the bitstream, moving picture of which are previously encoded, can be comprised within a pre-set range.

BRIEF DESCRIPTION OF THE DRAWINGS

FIGS. 6A, 6B illustrate bitstream re-encoding.

FIGS. 9A, 9B and 9C illustrate bitstream encoding ahead and in back of an editing point.

FIG. 11 illustrates specified picture re-encoding.

DESCRIPTION OF THE PREFERRED EMBODIMENTS

Figures 1A, 1B:
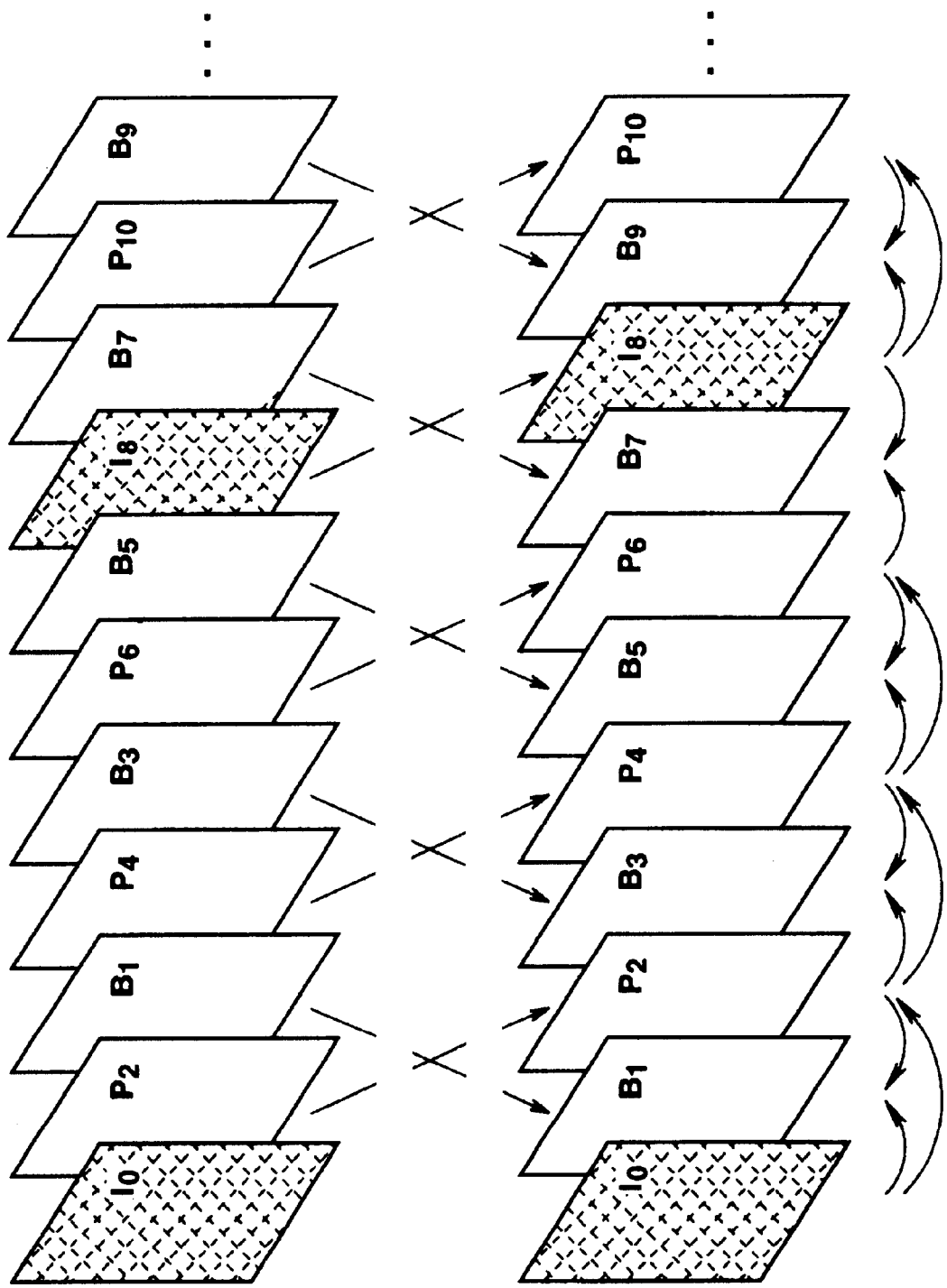
FIGS. 1A and 1B illustrate respective encoded pictures.

Referring to the drawings, preferred embodiments of the present invention will be explained in detail.

Figure 2:
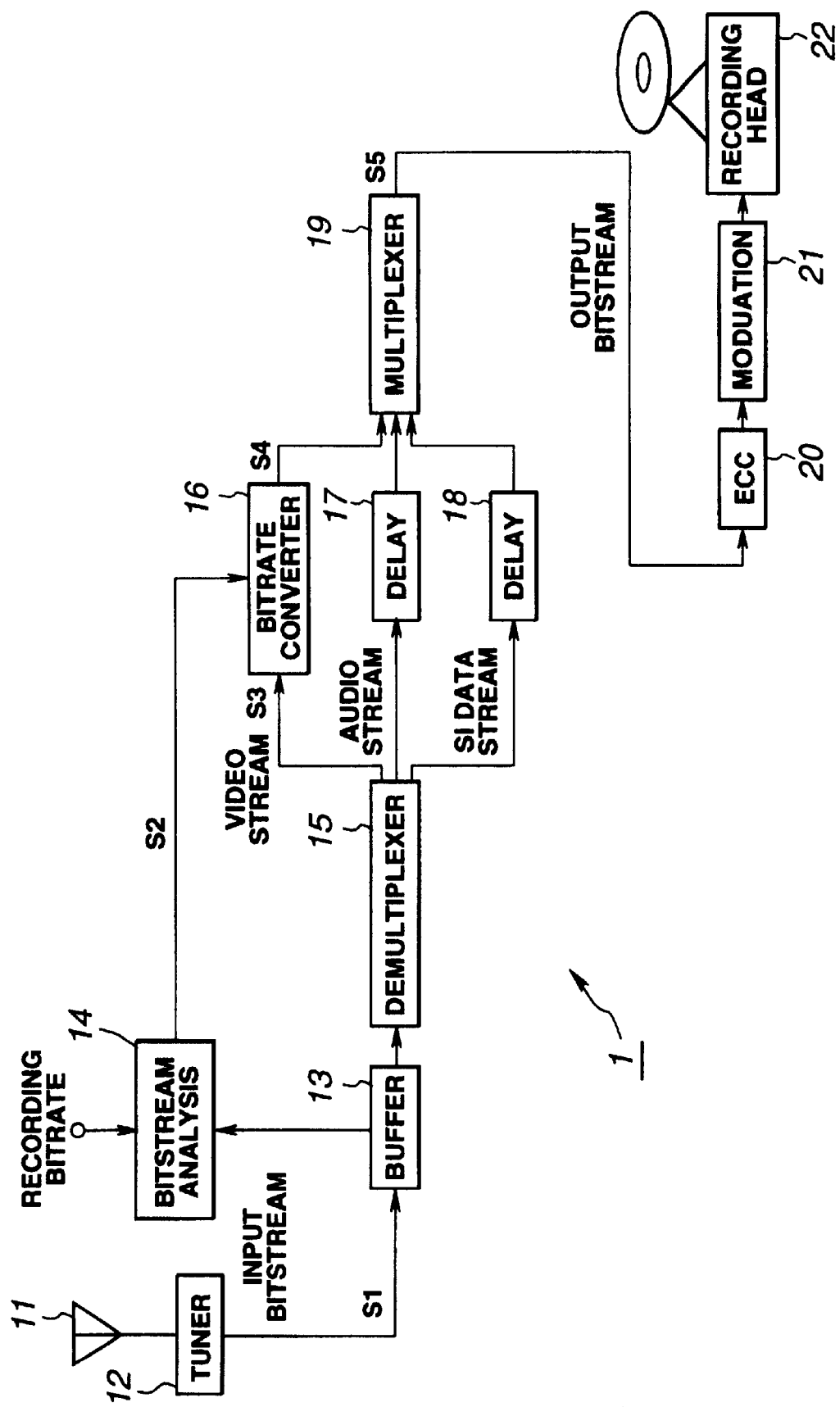
FIG. 2 is a block diagram showing a schematic entire structure of a moving picture encoding device according to a first embodiment of the present invention.

A first embodiment of the present invention, applied to a moving picture encoding device 1, as shown for example in FIG. 2, is explained.

The moving picture encoding device 1 includes a bitstream analysis circuit 14 for calculating the bitrate of an input bitstream SI obtained from a tuner 12, and a bitrate conversion unit 16 responsive to the results of analysis by the bitstream analysis circuit 14 to convert the bitrate of a video stream S3.

The tuner 12 extracts, from among transport streams of the digital television broadcast received over an antenna 11, a sole transport packet of the sole television program selected by the user, and sends the stream S1 comprised of the extracted transport packet to a buffer 13. The stream comprised of the extracted transport packet is termed a partial transport stream. If the transport stream uses statistic multiplexing, the partial transport stream is of a variable bitrate, with the bitrate changing from scene to scene.

The buffer 13 is a volatile memory of a pre-set memory volume for transiently storing the input bitstream S1. The buffer 13 sends the stored input bitstream to a demultiplexer 15.

The bitstream analysis circuit 14 calculates the bitrate of a transport stream in the buffer 13. Specifically, the bitrate of the transport stream between two transport packets containing the program clock reference (PCR) is calculated by the following equation (1):

$$\text{program\_rate}=((j-1)*\text{system\_clock\_frequency}))/(\text{PCR}(j)-\text{PCR}(i)) \quad (1)$$

where i, j and PCR(i) are defined as follows:
  i: an index number of a byte containing the last bit of a base field of the latest program_clock_reference applied to a decoded program;
  j: an index number of a byte containing the last bit of a base field of the directly following program_clock_reference applied to a decoded program, where i<j; and
  PCR(i): time of encoding with the base field and the extension field in terms of a system clock as a unit.

The bitstream analysis circuit 14 calculates the bitrate Rsi of an audio stream Ra and the service information (SI) data stream multiplexed on the transport stream.

The bitstream analysis circuit 14 verifies whether or not the input bitrate of a transport stream is not higher than the bitrate with which the transport stream is recorded on a recording medium. This decision is made by detecting whether or not the input bitrate has exceeded a pre-set reference value Rrec. This reference value Rrec can be set from the usable bit quantity B (bits) of the recording medium and the recording time in seconds by $$Rrec=B/T.$$

The multiplexer 15 reads out a transport stream from the buffer 13 to split the read-out transport stream into the video stream S3, an audio stream and SI data. It is noted that the video stream S3 is a stream conforming to the MPEG2 standard. The demultiplexer 15 sends the video stream S3 to the bitrate conversion unit 16, while sending the audio stream and the SI data to a delay circuit 17 and to a delay circuit 18, respectively.

The bitrate conversion unit 16 is responsive to a control signal S2 from the bitstream analysis circuit 14 to process the input stream. Meanwhile, if the bitrate of a pre-set domain (portion) of a transport stream fed to the demultiplexer 13 exceeds the reference value Rrec, the bitrate conversion unit 16 converts the video stream S3 of the pre-set domain to a video stream S4 of a bitrate not higher than a bitrate Rvx shown in the equation (2):

$$Rvx = Rrec - Ra - Rs1 \quad (2).$$

It is noted that, if the bitrate of a pre-set domain of the transport stream is not higher than the reference value Rrec, the bitrate of the output video stream S4 is equal to the bitrate of the input video stream S3.

The delay circuit 17 delays the audio stream a time length required in processing by the bitrate conversion unit 16 to send the delayed audio stream to a multiplexer 19.

The delay circuit 18 delays the SI data stream a time length required in processing by the bitrate conversion unit 16 to send the delayed SI data stream to the multiplexer 19.

The multiplexer 19 multiplexes input video stream S4, audio stream and the SI data stream to output a multiplexed stream S5.

The output bitstream S5 is corrected for errors by an ECC circuit 20. The bitstream, corrected for errors, is modulated with eight-to-fourteen modulation (EFM) by a modulation circuit 21. An output signal of the modulation circuit 21 is recorded as data by a recording head 22 illuminating a power-modulated laser light beam on a signal recording surface of an optical disc 23.

Figure 3:
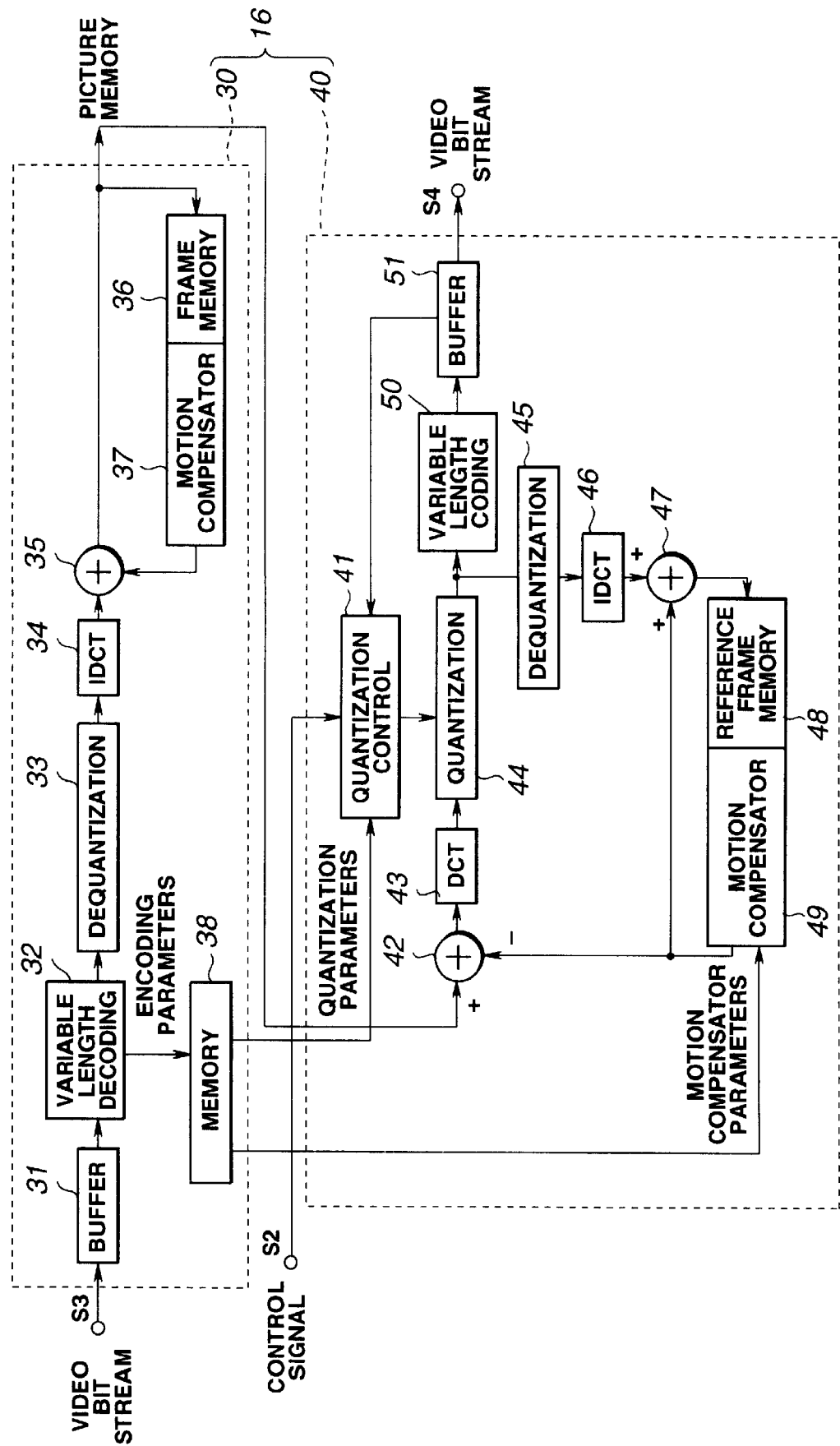
FIG. 3 is a block diagram showing a specified structure of a bitrate conversion unit of the moving picture encoding device.

The bitrate conversion unit 16 is configured as shown in FIG. 3. The bitrate conversion unit 16 includes a decoder 30 for decoding the input video stream S3 into picture signals or for extracting encoding parameters of the video stream S3, and an encoder 40 for re-encoding picture signals decoded by the decoder 30 into a bitstream of a pre-set bitrate based on the control signal S2.

The operating principle of the encoder 40 is as follows:

If the bitrate of the pre-set domain of the video stream S3 is specified by the control signal S2 to be not larger than Rvx of the equation (2), the encoder 40 re-encodes the video stream S3 of a pre-set domain to a stream S4 of the same bitrate as that of the video stream S3. When re-encoding, the encoder 40 utilizes all encoding parameters of the video stream S3 extracted by the decoder 30. This eliminates picture quality deterioration otherwise caused by re-encoding, as a principle, thus enabling the re-encoding of the stream of the same bitrate as that of the original video stream S3. If the bitrate of the pre-set domain of the video stream S3 is specified by the control signal S2 to be larger than Rvx of the equation (2), the encoder 40 re-encodes the video stream S3 of a pre-set domain to a video stream having a bitrate not larger than Rvx. When re-encoding, the encoder 40 utilizes encoding parameters other than the quantization parameters of the video stream S3 extracted by the decoder 30. The encoder 40 sets new quantization parameters so as to provide a video stream having a bitrate not larger than Rvx. In re-encoding, encoding parameters other than those of the video stream S3 are utilized to minimize the picture quality deterioration caused by the re-encoding.

The structure of the decoder 30 and the encoder 40 is now explained in detail.

An input bitstream of the MPEG2 standard is stored in a buffer 31 of the decoder 30. The bitstream from the buffer 31 is variable-length-decoded by a variable-length decoding circuit 32 where encoding parameters are generated. These encoding parameters are sent to a memory 38 for storage therein. A dequantization circuit 33 dequantizes quantized DCT coefficients sent thereto from the variable-length decoding circuit 32 to decode the DCT coefficients. The decoded DCT coefficients are processed by an inverse DCT circuit 34 with inverse DCT for decoding to picture signals. An output of the inverse DCT circuit 34 is summed by an addition circuit 35 to a signal derived from a frame memory 36 and a motion compensation circuit 37 based on motion compensation parameters, not shown, as designated by the variable-length decoding circuit 32. An output picture from the addition circuit 35 is turned into an output picture from the decoder 30 and sent to the frame memory 36.

The encoder 40 is fed with decoded pictures of the pre-set domain of the video stream S3 along with the encoding parameters and the control signals S2. The motion compensation parameters of the encoding parameters are sent to a motion compensation circuit 49, while the quantization parameters of the encoding parameters are sent to a quantization controller 41.

The operation of the encoder 40 when the bitrate of the pre-set domain of the video stream S3 is specified by the control signals S2 to be not larger than Rvx of the equation (2) is explained.

The picture signals outputted by the decoder 30 are fed to an addition circuit 42. The motion compensation parameters corresponding to the current input picture are sent from the memory 38 to a motion compensation circuit 49.

The addition circuit 42 performs addition, with the picture signals from the decoder 30 as an addition signal and with the picture signals read out from the motion compensation circuit 49 based on the motion compensation parameters as a subtraction signal, to send a difference picture signal as the result of the addition to a DCT circuit 43.

The DCT circuit 43 converts the difference picture signals into DCT coefficients, which are sent to a quantization circuit 44. The quantization controller 41 is fed from the memory 38 with quantization parameters corresponding to the current input DCT coefficients to send the quantization parameters to the quantization circuit 44. The quantization circuit 44 quantizes the input DCT coefficients with the designated quantization parameters to output quantization coefficients.

The quantization coefficients are turned via a variable length encoding circuit 50 and a data storing buffer 51 into an output stream S4 from the encoder 40. The quantization coefficients are also fed via a dequantization circuit 45 and an inverse DCT circuit 46 to an addition circuit 47. The addition circuit 47 sums outputs of the inverse DCT circuit 46 and the motion compensation circuit 49 to the quantization coefficients to send the result of addition to a frame memory 48. If the bitrate of the pre-set domain of the video stream S3 is specified in this manner by the control signal S2 to be no larger than Rvx of the equation (2), the totality of the encoding parameters of the video stream extracted by the decoder 30 are utilized for re-encoding, so that it is possible to encode a stream of the same bitrate as that of the original bitstream S21 can be re-encoded without substantially causing picture quality deterioration caused by re-encoding.

The operation of the encoder 40 when the bitrate of the pre-set domain of the video stream S3 is specified by the control signal S2 to be larger than Rvx of the equation (2) is explained.

In this case, the operation of the quantization controller 41 differs from the operation of the encoder 40 when the bitrate of the pre-set domain of the video stream S3 is not larger than Rvx of the equation (2). That is, the quantization controller 41 sets the quantization parameters so that the output bitrate from the encoder 40 will be Rvx to specify the parameters to the quantization circuit 44. Since the totality of the encoding parameters other than the quantization parameters are utilized for re-encoding, the bitstream with the bitrate of Rvx can be re-encoded with the minimum deterioration in the picture quality ascribable to the re-encoding.

The second embodiment of the present invention is hereinafter explained.

In the present second embodiment, the bitrate conversion unit 16 is not adapted to decode the bitstream into picture signals to then generate the rate-controlled bitstream, as in the first embodiment. Instead, the bitrate conversion unit 16 decodes the input video stream S3 as far as the encoding information, without decoding the bitstream up to the picture signals, to curtail the information volume of the encoding information to convert the stream bitrate.

Figure 4:
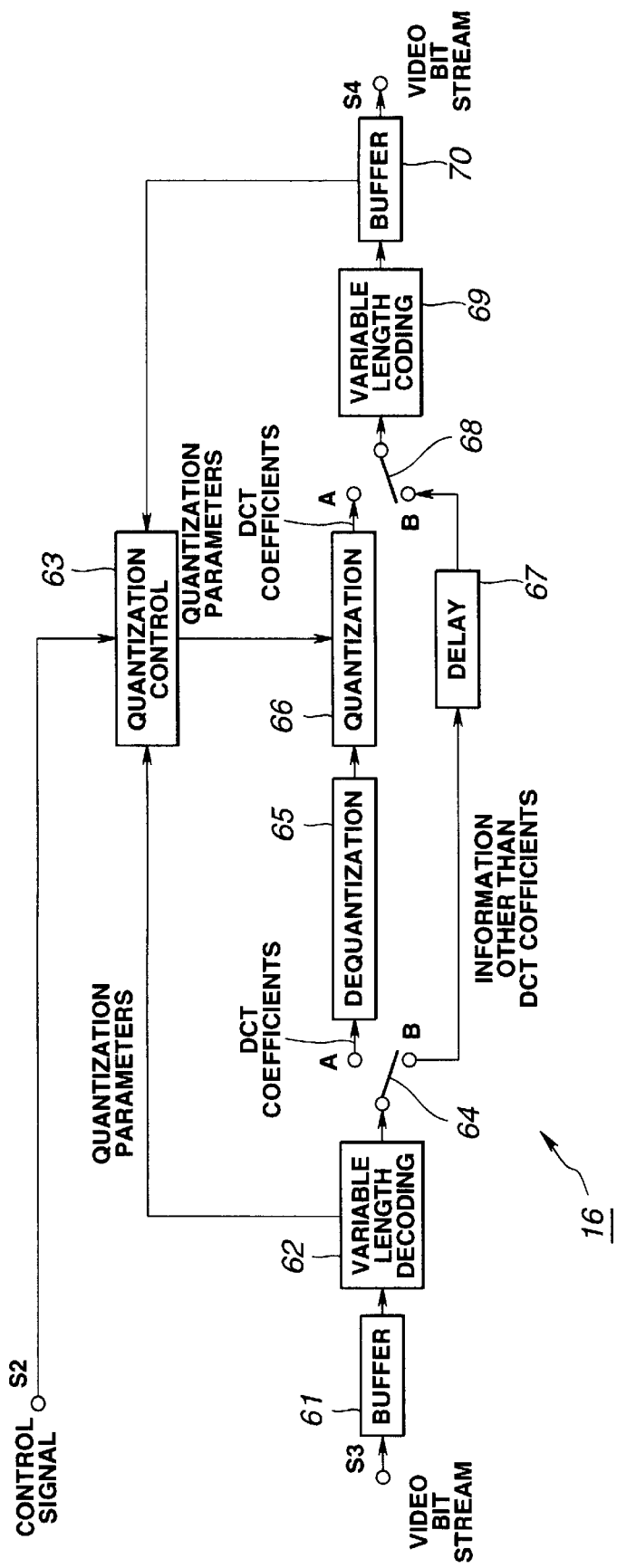
FIG. 4 is a block diagram showing a modified structure of the bitrate conversion unit as a second embodiment of the present invention.

Specifically, the bitrate conversion unit 16 includes a quantization controller 63 for controlling the bitrate of the output bitstream S4 to a pre-set value, a dequantization circuit 65 for decoding the input video stream as far as the DCT coefficients, and a quantization circuit 66 for re-quantizing the DCT coefficients, as shown in FIG. 4.

The input video stream S3 of the MPEG2 standard is stored in the buffer 61. The bitstream from the buffer 61 is variable length decoded by a variable length decoding circuit 62. An output of the quantization circuit 62 is split by a switch 64 into quantized DCT coefficients and other information. The quantization parameters from the variable length encoding circuit 62 are sent to the quantization controller 63. The dequantization circuit 65 dequantizes the quantized DCT coefficients from the variable length encoding circuit 62 to decode the DCT coefficients, which are outputted.

The operating principle of the quantization circuit 66 and the quantization controller 63 is explained.

First, the operation of the quantization circuit 65 and the quantization controller 63 when the bitrate of the pre-set domain of the video stream S3 is specified by the control signal S2 to be not larger than Rvx of the equation (2) is explained. In this case, the quantization controller 63 directly sends the quantization parameters of the original video stream S3 accorded from the variable-length decoding circuit 62 to the quantization circuit 66. Thus, in this case, the input to the dequantization circuit 65 is equal to the output of the quantization circuit 66.

If the bitrate Rvx of the video stream S3 is not larger than Rvx, the 16 outputs a video stream S4 having a bitrate equal to the bitrate of the video stream S3.

On the other hand, if the bitrate of the pre-set domain of the video stream S3 is specified by the control signal S2 to be larger than Rvx of the equation (2), the quantization control circuit 63 sets the quantization parameters so that the pre-set domain of the video stream S3 will have a bitrate not larger than Rvx, and routes the so-set quantization parameters to the quantization circuit 66, which then re-quantizes the input DCT coefficients with the so-set quantization parameters. Since the reproduced picture as a principle is susceptible to motion prediction mismatching errors, the output video stream S4 needs to be quantization-controlled so that the mismatching error will be as non-protrusive as possible.

The information other than the quantized DCT coefficients entered from the side B of the switch 64 is sent to a delay circuit 67, which then delays the input signal by a time length corresponding to the processing in the dequantization circuit 65 and in the quantization circuit 66 to output the delayed signals.

A variable length encoding circuit 69 variable-length encodes the input signal to send an output bitstream to a buffer 70. The quantization circuit 66 calculates the amount of bits of the bitstream sent from the variable length encoding circuit 69 to control the bitrate of the video stream S4 as discussed above.

Since the bitrate conversion unit 16 performs encoding at a lower bitrate, without completely decoding the video stream S3, if the bitrate of the video stream S3 is larger than Vrx, the processing time can be shortened as compared to the first embodiment.

Figure 5:
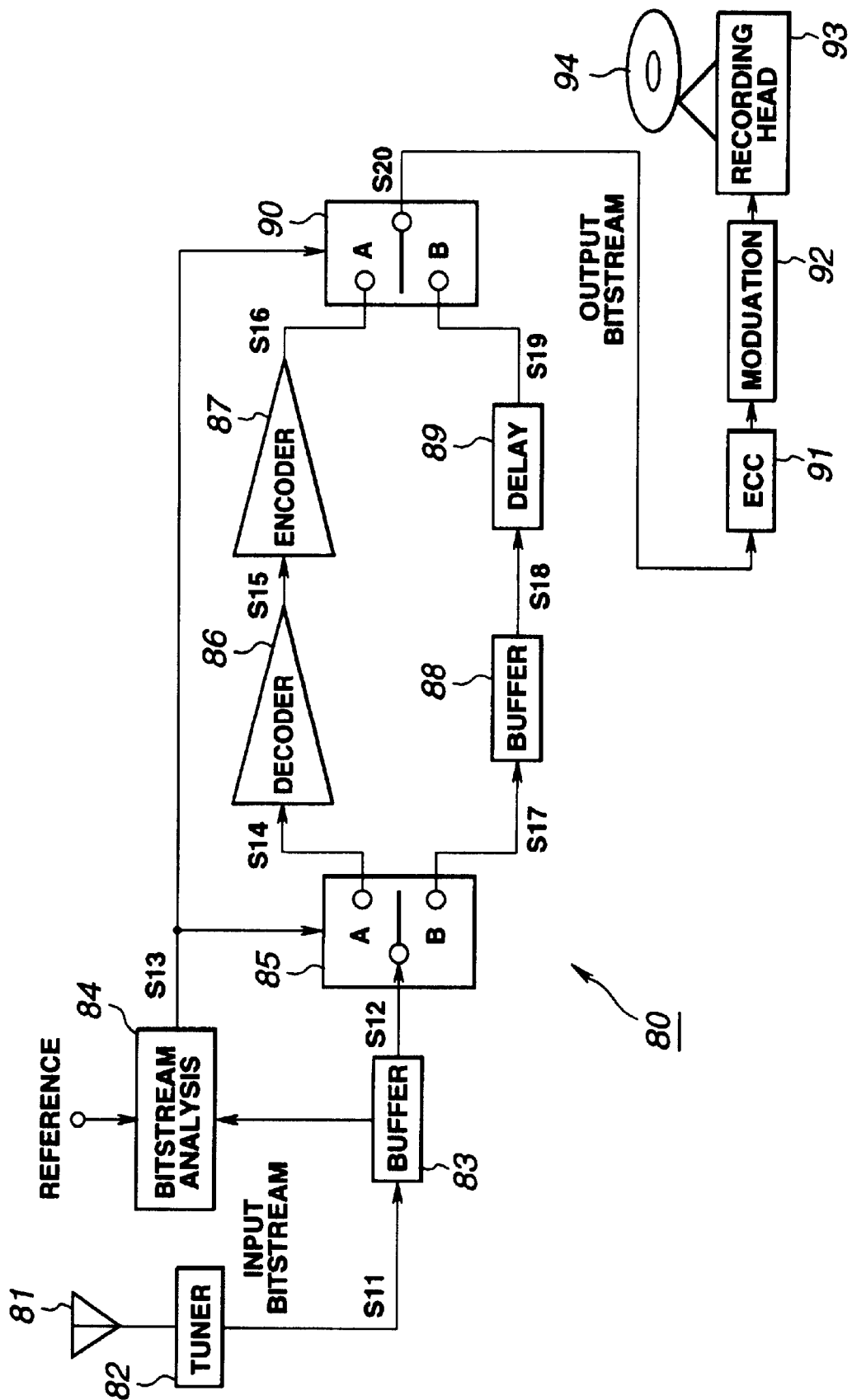
FIG. 5 is a block diagram showing an entire structure of a moving picture encoding device according to a third embodiment of the present invention.

A third embodiment of the present invention, applied to a moving picture encoding device 80 shown in FIG. 5, is hereinafter explained.

The moving picture encoding device 80 includes a tuner 82, for receiving moving picture data sent by electromagnetic waves over antenna 81 for converting it into a bitstream S11, a buffer 63 for transiently storing the bitstream from the tuner 82, and a bitstream analysis circuit 84 for analyzing the input bitstream to the buffer 83 by comparison with a reference value.

The tuner 82 receives digital television broadcast to output a bitstream S11 of the MPEG2 standard formed by encoded moving pictures. The buffer 83 is a volatile memory of a pre-set memory capacity for transiently storing the input bitstream S11 from the tuner 82.

The bitstream analysis circuit 84 verifies, from the bitstream in the buffer 83, whether or not the input bitrate of a bitstream in a certain domain of a GOP, a set of pictures of the MPEG2 standard, is such as to enable recording on a recording medium. This decision is given based on detection whether the input video rate has exceeded a reference value.

The moving picture encoding device 80 also includes a switch 85 for setting the bitstream S12 from the buffer 83 to one of a fixed terminal A or a fixed terminal B, under control by the bitstream analysis circuit 84, a decoder 86 for decoding the bitstream S14 from the fixed terminal A of the switch 85, and an encoder 87 for re-encoding the picture signals S15 from the decoder 86 to a bitstream S16.

The switch 85 is changed over in its operating state responsive to a control signal S13 from the bitstream analysis circuit 84. Specifically, the switch 85 is set to the fixed terminal A or to the fixed terminal B if the bitrate of the domain in question of the bitstream S12 exceeds the bitrate which permits recording or otherwise, respectively.

The bitstream s14 from the fixed terminal A of the switch 85 is decoded by the decoder 86 into picture signals S15. These picture signals S15 are re-encoded by an encoder 87 to give a bitrate which permits recording on the recording medium. The re-encoded bitstream S16 is outputted to a fixed terminal A of a switch 90. The decoder 86 and the encoder 87 make up re-encoding means for re-encoding the bitstream S14.

The moving picture encoding device 80 includes a buffer 88 for transiently storing the bitstream s17 from the fixed terminal B of the switch 85, and a delay circuit 89 for delaying the bitstream S18 from the buffer 88. The moving picture encoding device 80 also includes a switch 90 having a fixed terminal A to which is coupled the bitstream S16 from the encoder 87 and a fixed terminal B to which is coupled the bitstream S19 from the delay circuit 89. The switch 90 can be set to its fixed terminal A or to the fixed terminal B.

The buffer 88 transiently stores the bitstream S17 from the fixed terminal B of the switch 85. The delay circuit 89 delays the bitstream s18 from the buffer 88 at least by a time length corresponding to the time required for decoding by the decoder 86 and for encoding by the encoder 87. The bitstream S19, delayed by the delay circuit 89, is outputted to the fixed terminal B of the switch 90. The switch 90 is changed over in its operating state responsive to the control signal S13 from the bitstream analysis circuit 84. That is, if the input bitrate of a certain domain of the bitstream exceeds the bitrate that permits recording on the recording medium, the switch 90 is set to the fixed terminal A. If the input bitrate of a certain domain of the bitstream is not in excess of the bitrate that permits recording on the recording medium, the switch 90 is set to the fixed terminal B. This switch 90, thus changed over in its operating state, constitutes substitution means for doing substitution of a certain domain.

The moving picture encoding device 80 includes an ECC circuit 91 for processing the output bitstream S20 obtained from the switch 90 based on the error correction code (ECC), a modulation circuit 92 for modulating the bitstream processed by the ECC circuit 91 and a recording head 93 for recording signals from the modulation circuit 92 on an optical disc 101 as a recording medium.

The ECC circuit 91 performs error correction on a bitstream, while the modulation circuit 92 performs modulation for example, eight-to-fourteen modulation (EFM). The recording head 93 records data by illuminating the power-modulated laser light on the signal recording surface of the optical disc 94.

The processing of re-encoding a bitstream in the moving picture encoding device 80 is explained.

The bitstream sent to the moving picture encoding device 80 is arrayed with a GOP as a unit domain, as shown in FIG. 6A. The bitstream of FIG. 6A includes GOP-(n−1), GOP-n and GOP-(n+1), in the display sequence. Note that GOP-i means an ith GOP in the picture display sequence, that is, in the time-axis direction.

Each GOP is made up of an intra-coded picture (I-picture), which is a picture encoded without predictive coding from other pictures, a predictive coded picture (P-picture), which is a picture encoded using a predictive coding in the forward temporal direction, and a bidirectionally predictive coded picture (B-picture) which is a picture encoded using predictive coding in the temporally forward and temporally backward directions.

The GOP is made up of, for example, an I-picture, followed by plural P- and B-pictures, arrayed in a pre-set sequence.

That is, a GOP-n in FIG. 6A is made up of pictures In2, Bn0, Bn1, pn5, Bn3, Bn4, Pn8, Bn6 and Bn7. Meanwhile, Iij, Pij and Bij denote a jth I-picture in the display sequence in an ith GOP, a jth P-picture in the display sequence in the ith GOP and a jth B-picture in the display sequence in the ith GOP, respectively.

The bitstream S11 is sent at a variable bitrate Rin to the buffer 83, from which the bitstream S12 is outputted at a bitrate Rout1, which is larger than the maximum bitrate of the stream S11.

Initially, the bitstream S12 is sent via fixed terminal B to the buffer 88. From the buffer 88, the bitstream S18 is outputted at a bitrate Rout2, which is pertinent to the bitrate when recording the bitrate on a recording medium and is smaller than Rout1. The bitrate Rout1 is zero when the buffer 88 is full.

When the mean value of the variable bitrate Rin is not larger than Rout2, there is no risk of overflow of the buffer 83. In this case, the switch 85 is set to the fixed terminal B, such that the bitstream S12 is outputted via buffer 88, delay circuit 89 and the fixed terminal B of the switch 90.

If, when the average value of the variable bitrate Rin is larger than the bitrate Rout2, the bit storage quantity in the buffer 83 exceeds a pre-set upper limit value, the switch 85 is set to the fixed terminal A. The bitstream S14, entered via the fixed terminal A of the switch 85, is decoded by the decoder 86 to give a decoded picture S15 which is encoded by the encoder 87 at a bitrate not higher than the bitrate Rout2 to output the bitstream S16.

The bitstream S16 is outputted via the fixed terminal A of the switch 90. If the bit storage quantity of the buffer 83 is smaller than a pre-set reference value, the switch 85 is again set to the fixed terminal B to permit the bitstream S17 to enter the buffer 88.

The buffer 88 and the delay circuit 89 delay the input bitstream S17 at least by time required for decoding and encoding in the decoder 23 and the encoder 87 to output the delayed bitstream.

The changeover control of the switch 85 may be performed by the bitstream analysis circuit 84 shown in FIG. 5. Specifically, the bitrate every unit time length, for example, every GOP, in the bitstream S11, is calculated and, if the bitrate is larger than Rout2, this bitstream is re-encoded via fixed terminal A of the switch 85.

Figure 7:
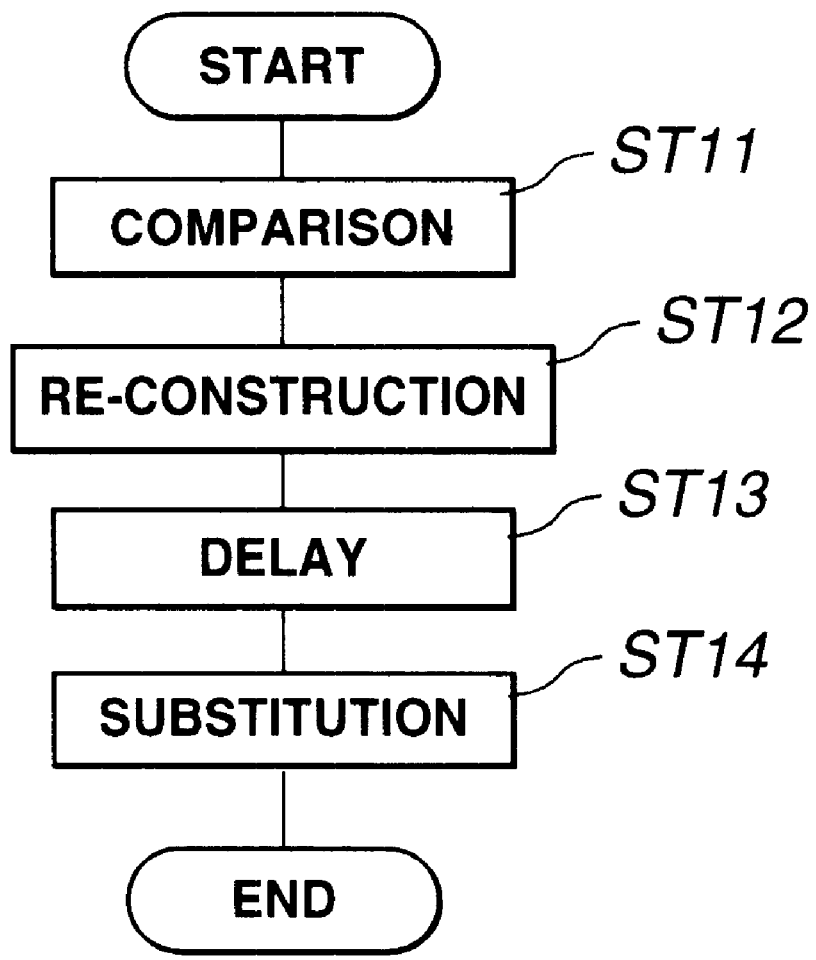
FIG. 7 is a flowchart showing processing contents of the motion picture encoding device.

The processing contents of the moving picture encoding device 80 are now explained with reference to the flowchart of FIG. 7.

At the first step ST11, the bitrate of a unit domain of a bitstream, pictures of which have been encoded, is compared to a reference value. If the bitrate of the unit domain is detected at ST11 to be in excess of the reference value, the unit domain of the input bitstream is decoded at the next step ST12 to picture signals, which are then re-encoded into a bitstream of the unit domain having a bitrate not higher than the reference value, before processing transfers to step ST13.

At step ST13, the input bitstream is delayed at least a time length corresponding to the re-encoding time at step ST12. At the next step ST14, the bitstream of the unit domain, re-encoded at step ST12, is substituted for the unit domain of the bitstream from the step ST13. The resulting bitstream is then outputted to complete a sequence of operations of the moving picture encoding method.

As described above, if the bitrate of a unit domain, such as GOP, of the input MPEG bitstream, exceeds the maximum bitrate as set in, for example, an application in use, the moving picture encoding device 80 decodes the bitstream of the domain to re-encode the bitstream to a bitstream having a bitrate not larger than the maximum bitrate of the decoded picture to couple the re-encoded bitstream to bitstreams ahead and in back of the domain to output the bitstream shown in FIG. 6B.

The moving picture encoding device 80 is not limited to the real-time operation. For example, the GOP-new-n may be prepared from the outset and coupled at the time of reproduction.

Figure 8:
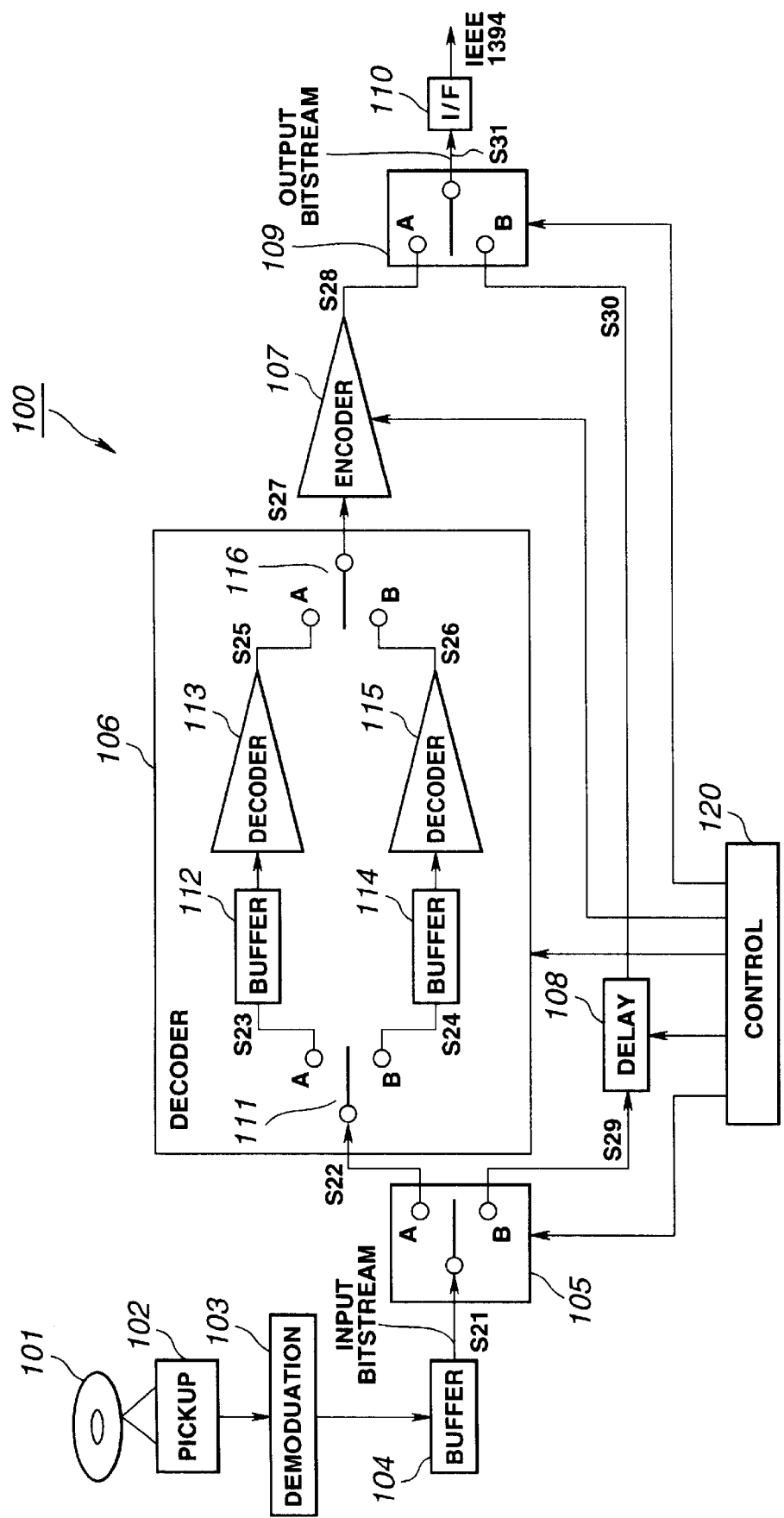
FIG. 8 is a block diagram showing an entire structure of a moving picture encoding device according to a fourth embodiment of the present invention.

A fourth embodiment of the present invention is now explained with reference to FIG. 8, in which a moving picture encoding device 100 includes a pickup 102 for reading out data recorded on an optical disc 101 as a recording medium, a demodulating circuit 103 for demodulating signals from the pickup 102 into a bitstream, and a buffer 104 for transiently storing the bitstream from the demodulating circuit 103.

The pickup 102 illuminates the laser light on a recording track of the signal recording surface of the rotating optical disc 101 to read out moving picture data recorded on the optical disc 101. The demodulating circuit 103 demodulates moving picture data accorded from the pickup 102 into a bitstream of the MPEG2 standard. This input bitstream is transiently stored in the buffer 104.

The moving picture encoding device 100 also includes a switch 105 for setting the bitstream S21 from the buffer 104 to the fixed terminal A or to the fixed terminal B, a decoder 106 for decoding the bitstream S22 from the fixed terminal A of the switch 105 into picture signals and an encoder 107 for encoding picture signals S27 from the decoder 106.

The switch 105 is responsive to control signals from a control circuit 120 to set the bitstream S21 entered from the buffer 104 to the fixed terminal A or to the fixed terminal B. The decoder 106 decodes the bitstream S22 from the switch 105 into picture signals S27 which then are encoded by the encoder 107.

The decoder 106 includes a switch 111 for setting the bitstream S22 from the fixed terminal A of the switch 105 to the fixed terminal A or to the fixed terminal B, a buffer 112 for transiently storing the bitstream S23 from a fixed terminal A of the switch 111 and a decoder 113 for decoding the bitstream from the buffer 112.

The decoder 106 also includes a buffer 114 for transiently storing the bitstream S24 from the fixed terminal B of the switch 111, a decoder 115 for decoding the bitstream form the buffer 114, and a switch 116 for coupling the bitstream S26 from the decoder 115 and the bitstream S26 from the decoder 115 to the fixed terminal A and to the fixed terminal B, respectively, and for being set to the fixed terminal A or to the fixed terminal B.

The buffers 112, 114 are memories for transiently storing the bitstream S22 entering the decoder 116. These buffers 112, 114 are used for decoding the bitstream of the MPEG2 standard in the downstream side decoders 113, 115. These buffers 112 and 114 are used for decoding the bitstream of the MPEG2 standard in the downstream side decoders 113, 115. The capacity of these buffers 112, 114 are prescribed by the standards of MPEG2 MP@ML (main profile/main level) and is, for example, of the order of 1.75 Mbits.

The bitstreams sent to these buffers 112, 114 are switched by the switch 111 so as to be sent to one of the buffers 112 or 114.

The decoders 113, 115 decode the bitstream compressed in accordance with the MPEG system to generate digital picture data. These decoders 113, 115 decode the pictures in accordance with the decoding time control information (DTS) attached to the respective pictures of the encoded data.

The decoding unit 106 is controlled by a control circuit 120, which manages the bit storage quantities of the buffers 112, 114 to control the bitrate of the bitstream to be read. Also, in skipping reproduction, the control circuit 120 changes over the state of the switch 105 at the timing of an interruption between a stream containing an outpoint picture and a stream containing an in-point picture.

The decoding unit 106 has two decoders 113, 115 for simultaneously decoding the bitstream S23 and the bitstream S24. These decoders 113, 115 decode the bitstream on the GOP basis for interconnecting the in-point and the out-point in the bitstream. The switch 116 is timed to the control signals of the control circuit 120 to switch between signals of the decoders 113 and 115 to output the selected signal to the encoder 107.

The moving picture encoding device 100 also includes a delay circuit 108 for delaying the bitstream S109 from the fixed terminal B of the switch SW105, an encoder 107 for encoding the picture signals S27 outputted by the switch 116 of the decoder 2 to a bitstream S28 and a switch 109 for switching between a fixed terminal A fed with the bitstream S28 from the encoder 107 and a fixed terminal B fed with the bitstream S30 from the delay circuit 108 to select one of these fixed terminals A or B.

The delay circuit 108 sends the bitstream S29 from the fixed terminal B of the switch 105 with a pre-set delay to the fixed terminal B of the switch 105. The delay time in the present embodiment is 4-frame time, as will be explained subsequently.

The decoder unit 106 and the encoder 107 constitute re-encoding means for decoding and subsequently encoding an input bitstream. The encoder 107 re-encodes only pictures decoded by the decoder unit 106 and which are required in connection with the in-point and the out-point.

The moving picture encoding device 100 also includes an interfacing circuit 110 for converting a bitstream S31 from a switch 109 and a control circuit 120 for controlling the interfacing circuit 110, a switch 105, a decoder unit 106, a delay circuit 108, an encoder 107 and a switch 105. The switch 109 constitutes switching means for switches between the stream S28 or the stream S30, under control by the control circuit 120, to output an output bitstream S31.

The interfacing circuit 110 converts the bitstream S31 from the switch 109 into data of the digital bus form of the IEEE 1394 standard to output the converted data to outside.

The processing of a bitstream by the present moving picture encoding device is now explained.

The moving picture encoding device 100 processes the bitstreams as shown in FIG. 9A. These bitstreams is an array of encoded bitstreams on a storage medium and are comprised of GOP-(−1), GOP-0, GOP-n and GOP-(n+1), where GOP-i means an ith GOP along the time axis or in the picture display sequence.

In the above bitstreams, GOP-0 is an out-point side GOP including an outpoint, while GOP-n is an in-point side GOP including an in-point.

The GOP-0, as an out-point side GOP, is made up of pictures I02, B00, B01, P05, B03, B04, P08, B06, B07. The GOP-n, as an in-point side GOP, is made up of pictures In2, Bn0, Bn1, Pn5, Bn3, Bn4, Pn8, Bn6, Bn7. The picture symbols are as explained previously.

Of these pictures, an out-point picture Pout corresponds to an out-point is B04 of GOP-0, while an in-point picture corresponds to an in-point is Pn5 of GOP-n.

The moving picture encoding device performs the processing as later explained to re-encode the out-point side GOP-0 containing the out-point picture Pout and the in-point side GOP-n containing the in-point picture Pin so that a new GOP will be constructed by a GOP-new-0 and a GOP-new-n obtained on re-encoding. The array of re-encoded and edited encoded bitstreams is shown in FIG. 9B.

The leading picture of the GOP-new-n, next following the GOP-new-0, obtained on re-encoding, may also be a B-picture instead of the I-picture. If, in the GOP-new-n, closed_gop=0, the leading B-picture of the GOP-new-n refers to GOP-new-0 for prediction.

It is noted that closed_gop is a 1-bit flag in the MPEG GOP header and specifies the type of prediction used in a B-picture directly following the first I-picture lying next to the GOP header.

The closed_gop set to 1 indicates that the B-picture directly following the first I-picture consecutive to the GOP header has been encoded using only the backward prediction or intra-coding.

For example, if, in the following picture string:

Ia0 Pa3 Ba1 Ba2| Ix2 Bx0 Bx1 Px5 Bx3 Bx4 where | stands for a GOP boundary, the closed_gop of the GOP beginning from Ix2 is set to "1", it indicates that Bx0 and Bx1 are encoded using only the backward prediction from Ix2 or intra-coding, without using the forward prediction from Pa3 nor bidirectional prediction from Pa3 and Ix2.

If the closed_gop is set to 0, the GOP in question refers to the picture of the directly previous GOP.

The pictures reproduced from the edited bitstreams are arrayed in the frame sequence of F00, F01, F02, F03, F04, Fn4, Fn3, Fn6, Fn7, Fn8. It is noted that a picture Fij corresponds to pictures Iij, Bij and Pij having the same suffix letters.

In the present embodiment, moving picture data read out from the optical disc 101 is demodulated by the demodulating circuit 103 into a bitstream of the mPEG2 standard. This input bitstream is decoded by the decoding unit 2 into picture signals which are re-encoded. The delay time until outputting of the bitstream is 4-frame time. The contents of the delay time are as follows:

In the decoding by the decoding unit 2, it is assumed that a picture sequence is outputted with a one-frame delay since the inputting of the bitstream. The start-up delay on decoding start time is assumed to be zero. In the encoding by the encoder 107, it is assumed that the bitstream is outputted with 3-frame delay since the inputting of the picture sequence.

Figure 10:
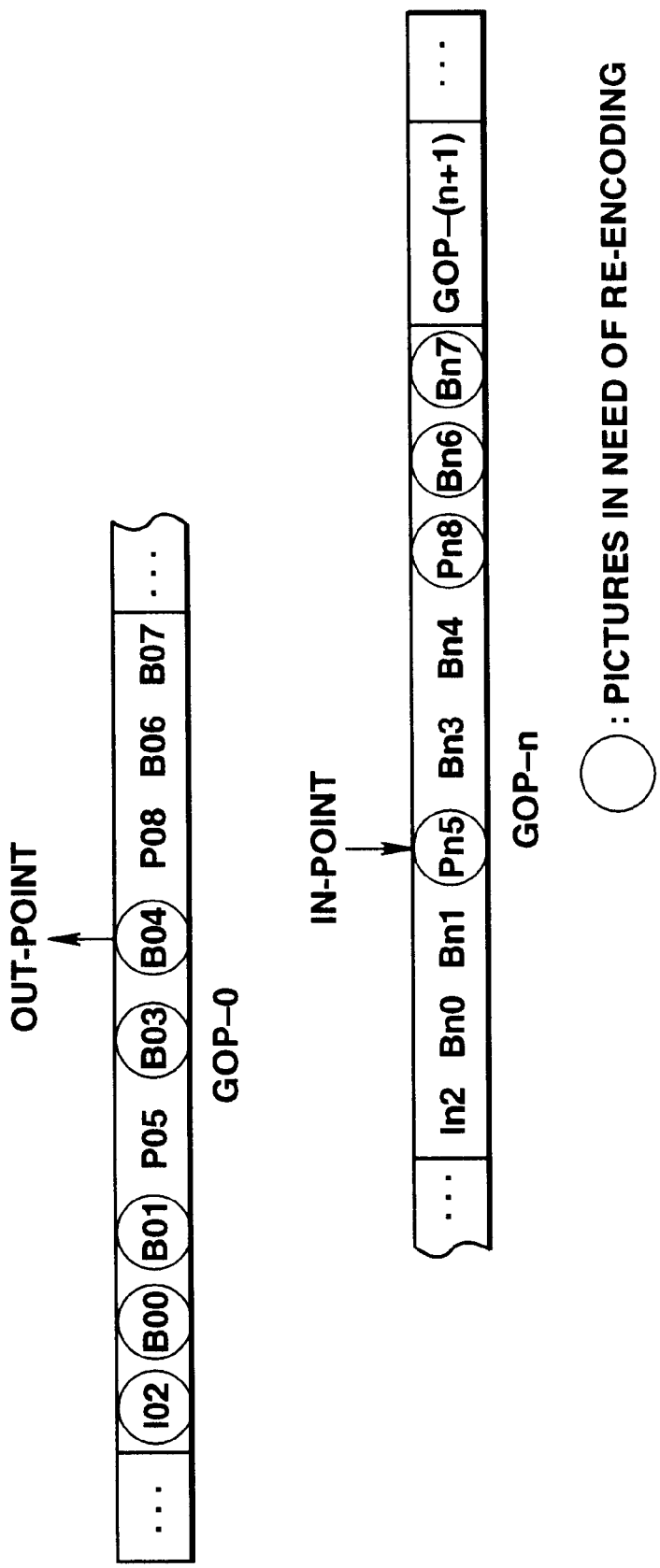
FIG. 10 shows pictures in need of re-encoding.

Specifically, the manner in which the bitstreams shown in FIG. 10 is processed by the moving picture encoding device 100 is explained. These bitstreams are the same as those shown in FIG. 9A and include an out-point side GOP-0 and an in-point side GOP-n. On the out-point side GOP, the pictures I02, B00, B01 and B03 and the out-point picture B04 need to be re-encoded. On the in-point side GOP, the pictures Pn8, Bn6, Bn7 and the in-point picture Pn5, need to be re-encoded, in accordance with the display sequence indicated by the suffix letters.

The processing of the bitstreams or picture signals in respective stages of the moving picture encoding device 100 is carried out as shown in FIG. 11.

To the buffer 112 of the decoder unit 106 is entered an array of pictures I02, B00, B01, P05, B03, B04, P08, B06, B07, making up the out-point side GOP of FIG. 10. This bitstream S23 is decoded by the decoder 113 into picture signals S25. These picture signals contain frames F00, F01, F02, F03 and F04. The suffix letters of the frame F denote correspondence to I-, P- and B-pictures having the same suffix letters.

The picture coding types, allocated to these frames, are B, B, I, B, P, in agreement with the types of the original pictures. The delay of picture signals S25 from the bitstream S23 is 1 frame, with startup delay being 0.

The bitstream S28 (S25), obtained on encoding the picture signals S25 entered from the decoder 113 and the picture coding type, contains an array of pictures I02, B00, B01, P04 and P03. This bitstream S28 is delayed by four frames.

The buffer 114 is fed with a GOP-n, which is an in-point side GOP constituted by pictures In2, Bn0, Bn1, Pn5, Bn3, Bn4, Pn8, Bn6, Bn7. This bitstream S24 is decoded by the decoder 115 and turned into picture signals. These picture signals contain Fn0, Fn1, Fn2, Fn3, Fn4, Fn5, Fn6, Fn7 and Fn8.

The picture coding types, allocated to the frames Fn5 to Fn8, among the above pictures, are I, B, B, P, in agreement with the types of the original pictures. The delay of picture signals S24 from the bitstream S26 is 1 frame, with startup delay being 0.

The bitstream S28 (S26 input), obtained on encoding the picture signals S26 entered from the decoder 115 and the picture coding type, contains an array of pictures In5, Pn8, Bn6 and Bn7. This bitstream S28 is delayed by four frames.

The delay circuit 108, fed with a GOP-n, as an in-point side GOP, is delayed by four frames and is outputted as a bitstream S30.

The bitstream S28 from the encoder 107 and the bitstream S30 from the delay circuit 108 are switched by the switch 109 under control by the control circuit 120, so that the GOP-(n+1), next following 102, B00, B01, P04, B03, In5, Pn8, Bn6 and Bn7, constituted by the GOP-new-0 obtained on re-encoding the GOP-0 and the GOP-new-n obtained on re-encoding the GOP-n, is now the output bitstream S31.

Meanwhile, the decoders 113, 115 in the decoding unit 106 may be constituted by a decoder decoding the pictures at a rate higher than the display rate of decoded pictures, for example, at a double rate.

If the double-speed decoder is used, the encoded data can be decoded during the decoding step at a rate higher than the display rate of the encoded data, such that a picture displayed at a first time point and a picture displayed at a second time point can be outputted in succession, at the same time as the reference synchronization signal is changed at a second time point. This enables skipping reproduction while continuity is maintained ahead and in back of a switching point.

By using this double-speed decoder, and by controlling the outputting of an output of decoded picture from the frame memory, based on the sum of the presentation time stamp (PTS) of the last picture displayed before skipping and the picture display time and on the PTS of a picture initially displayed following the skipping, the above processing can be achieved. Meanwhile, the PTS is a time management information of the playback output.

Figure 12:
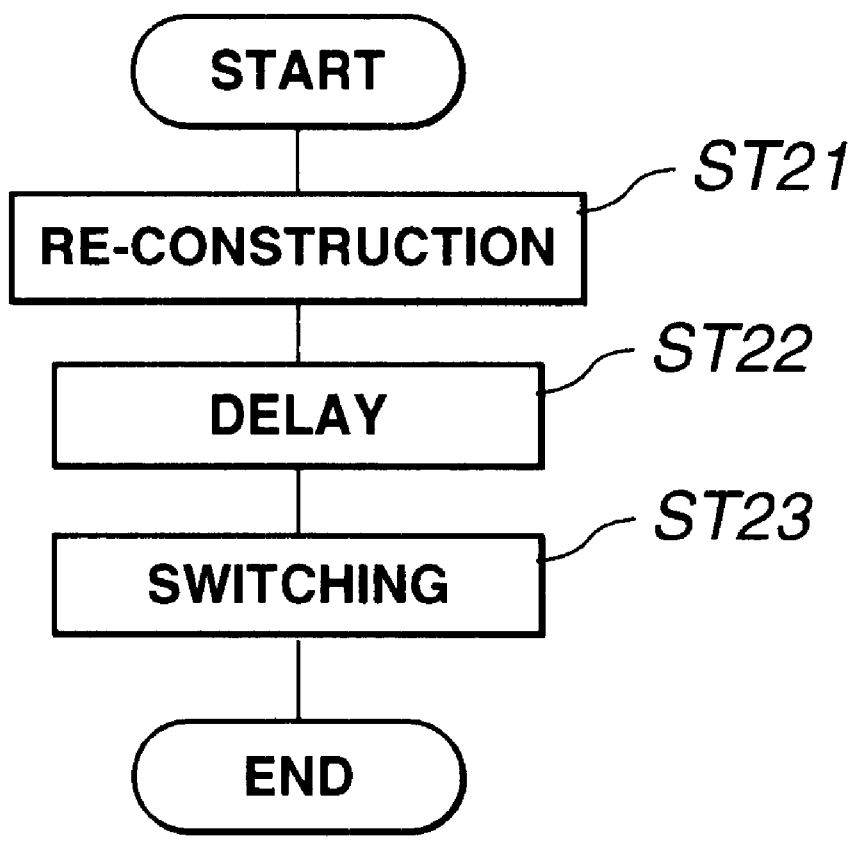
FIG. 12 is a flowchart for illustrating the processing contents of the moving picture encoding device.

The process of the moving picture encoding method according to the second embodiment is shown in a flowchart of FIG. 12.

The step S21 is a re-constructing process of re-constructing a portion of an input bitstream of the MPEG2 standard up to an out-point in the display sequence of a GOP containing the out-point into a first GOP that can be decoded without reference for prediction to pictures downstream of the out-point, and re-constructing another portion of the input bitstream up to an in-point in the display sequence of another GOP containing the in-point into a second GOP that can be decoded without reference for prediction to pictures upstream of the out-point. Then, processing transfers to step S22.

At step S22, the input bitstream is delayed at least for a time duration necessary for re-construction in step S21. At the next step S23, switching is made between a bitstream from step S21 and a bitstream from step S22 on the GOP basis to output the selected bitstream. This terminates a sequence of operations.

Thus, the moving picture encoding device 100 decodes a portion of an input bitstream and re-encodes a portion of the decoded picture signals to output the resulting bitstream. The input bitstream is outputted at least after a time delay corresponding to the decoding and the re-encoding. The two outputs are issued in a switching manner to output the edited bitstream.

The above-described moving picture encoding method and device may be used for specifying skipping reproduction of the MPEG video program and real-time preparation of the edited bitstreams. As an application, the edited bitstream may be transferred over an IEEE1394 digital bus so as to be received by a reception side decoder or copied on a reception side storage medium.

The above-described moving picture encoding method and device may also be used for decoding a certain domain of a bitstream entered in real-time and coupling a bitstream prepared on re-encoding decoded pictures to bitstreams ahead and in back of the re-encoded domain to output the resulting bitstream.

If the bitrate of a certain domain, such as a GOP, of an input MPEG bitstream, exceeds the maximum bitrate as set by an application, the bitstream of the domain is decoded and the resulting decoded pictures are re-encoded to a bitstream having a bitrate not higher than the maximum bitrate. The bitstream obtained on re-encoding and the bitstreams ahead and in back of the domain are coupled to each other and outputted.

The present invention is not limited to the above-described embodiments. For example, the input bitstream source in the third embodiment of the moving picture encoding device is not limited to the tuner 82 of the digital television broadcast, while the output destination from the switch 109 in the fourth embodiment of the moving picture encoding device is not limited to the interfacing circuit 110 used for conversion to the IEEE1394 standard.

The number of pictures in a GOP or the picture type are, of course, not limited to those shown in the above-described embodiments.

What is claimed is:

1. A moving picture encoding apparatus comprising:
   comparator means for comparing the bitrate of a unit domain of a bitstream, pictures of which are previously encoded, to a reference value;
   bitrate conversion means for converting said unit domain of the bitstream so that said bitrate will be not higher than said reference value if said comparator means verifies that the bitrate of the unit domain of the bitstream is in excess of said reference value, said bitrate conversion means outputting the bitstream with the bitrate remaining unchanged if said comparator means verifies that the bitrate of said unit domain of the bitstream is not in excess of the reference value.

2. The moving picture encoding apparatus according to claim 1 wherein said bitrate conversion means includes means for decoding the unit domain of the bitstream to picture signals if said comparator means verifies that the bitrate of the unit domain of the bitstream is in excess of said reference value, said bitrate conversion means encoding the decoded picture signals into a unit domain of a bitstream at a bitrate slower than said reference value.

3. The moving picture encoding apparatus according to claim 1 wherein said bitrate conversion means includes information volume curtailing means for encoding the information obtained in the course of decoding the unit domain of the input bitstream into picture signals into a unit domain of a bitstream at a bitrate slower than said reference value for curtailing the volume of the encoded information if said comparator means verifies that the bitrate of the unit domain of the bitstream is in excess of said reference value.

4. The moving picture encoding apparatus according to claim 3 wherein said information volume curtailing means includes dequantization means for converting the input bitstream into discrete cosine transform coefficients and quantization means for requantizing said discrete cosine transform coefficients.

5. The moving picture encoding apparatus according to claim 1 wherein said comparator means compares the bitrate of the unit domain of the bitstream to a reference value determined based on the usable bit quantity of the recording medium and the recording time.

6. The moving picture encoding apparatus of claim 1 wherein said unit domain is a group-of-pictures (GOP) of the bitstream, said GOP containing I-, P- and B-pictures arranged in a pre-set sequence.

7. The moving picture encoding apparatus according to claim 1 wherein the bitrate conversion of the unit domain is performed by re-quantizing DCT coefficients of the unit domain.

8. A moving picture encoding method comprising the steps of:
   comparing the bitrate of a unit domain of a bitstream, pictures of which are previously encoded, to a reference value;
   converting said unit domain of the bitstream so that said bitrate will be not higher than said reference value if said comparator step verifies that the bitrate of the unit domain of the bitstream is in excess of said reference value, said bitrate conversion step outputting the bitstream with the bitrate remaining unchanged if said comparator step verifies that the bitrate of said unit domain of the bitstream is not in excess of the reference value.

9. The moving picture encoding method according to claim 8 wherein said bitrate conversion step includes a step for decoding the unit domain of the bitstream to picture signals if said comparator step verifies that the bitrate of the unit domain of the bitstream is in excess of said reference value, said step encoding the decoded picture signals into a unit domain of a bitstream at a bitrate slower than said reference value.

10. The moving picture encoding method according to claim 8 wherein said bitrate conversion step includes an information volume curtailing step for encoding the information obtained in the course of decoding the unit domain of the input bitstream into picture signals into a unit domain of a bitstream having a bitrate slower than said reference value for curtailing the volume of the encoded information if said comparator step verifies that the bitrate of the unit domain of the bitstream is in excess of said reference value.

11. The moving picture encoding method according to claim 10 wherein said information volume curtailing step includes a dequantization step for converting the input bitstream into discrete cosine transform coefficients and a quantization step for requantizing said discrete cosine transform coefficients.

12. The moving picture encoding method according to claim 8 wherein said comparator step compares the bitrate of the unit domain of the bitstream to a reference value determined based on the usable bit quantity of the recording medium and the recording time.

13. The moving picture encoding method of claim 8 wherein said unit domain is a group-of-pictures (GOP) of the bitstream, said GOP containing I-, P- and B-pictures arranged in a pre-set sequence.

14. The moving picture encoding method of claim 8 wherein the bitrate conversion of the unit domain is performed by re-quantizing DCT coefficients of the unit domain.

15. A moving picture encoding apparatus comprising:
   comparator means for comparing the bitrate of a unit domain of a bitstream, pictures of which are previously encoded, to a reference value;
   re-encoding means for decoding a unit domain of an input bitstream into picture signals and re-encoding a unit domain of the input bitstream into picture signals if said comparator means verifies that the bitrate of the unit domain of the bitstream is in excess of the reference value, said re-encoding means re-encoding the decoded picture signals into a unit domain of a bitstream having a bitrate not higher than said reference value; and
   substitution means for substituting the unit domain of the bitstream re-encoded by said re-encoding means for said unit domain of the input bitstream and outputting the resulting bitstream.

16. The moving picture encoding apparatus according to claim 15 further comprising:

delaying means for delaying the input bitstream;

said substitution means substituting the unit domain of the bitstream re-encoded by said re-encoding means for said unit domain of the bitstream from said delaying means.

17. The moving picture encoding apparatus according to claim 15 wherein said re-encoding means re-encodes the decoded picture signals into a bitstream having a bitrate of a pre-set range.

18. The moving picture encoding apparatus of claim 15 wherein said unit domain is a group-of-pictures (GOP) of the bitstream, said GOP containing I-, P- and B-pictures arranged in a pre-set sequence.

19. The moving picture encoding apparatus of claim 15 wherein the re-encoding of the unit domain is performed by re-quantizing DCT coefficients of the unit domain.

20. The moving picture encoding apparatus of claim 15 wherein said re-encoding means comprises a decoder and encoder connected in series, said decoder performing said decoding of the unit domain of the input bitstream, said encoder re-encoding a decoded output of said decoder.

21. A moving picture encoding method comprising:

a comparator step for comparing the bitrate of a unit domain of a bitstream, pictures of which are previously encoded, to a reference value;

a re-encoding step for decoding a unit domain of an input bitstream into picture signals and re-encoding a unit domain of the input bitstream into picture signals if said comparator step verifies that the bitrate of the unit domain of the bitstream is in excess of the reference value, said re-encoding step re-encoding the decoded picture signals into a unit domain of a bitstream having a bitrate not higher than said reference value; and a substitution step for substituting the unit domain of the bitstream re-encoded by said re-encoding step for said unit domain of the input bitstream and outputting the resulting bitstream.

22. The moving picture encoding method according to claim 21 further comprising:

a delaying step for delaying the input bitstream;

said substitution step substituting the unit domain of the bitstream re-encoded by said re-encoding step for said unit domain of the bitstream from said delaying step and outputting the resulting bitstream.

23. The moving picture encoding method according to claim 21 wherein said re-encoding step re-encodes the decoded picture signals into a bitstream having a bitrate within a pre-set range.

24. The moving picture encoding method of claim 14 wherein said unit domain is a group-of-pictures (GOP) of the bitstream, said GOP containing I-, P- and B-pictures arranged in a pre-set sequence.

25. The moving picture encoding method of claim 14 wherein the re-encoding of the unit domain is performed by re-quantizing DCT coefficients of the unit domain.

* * * * *